June 23, 1970  H. R. PHILIPP  3,517,198
LIGHT EMITTING AND ABSORBING DEVICES
Filed Dec. 1, 1966
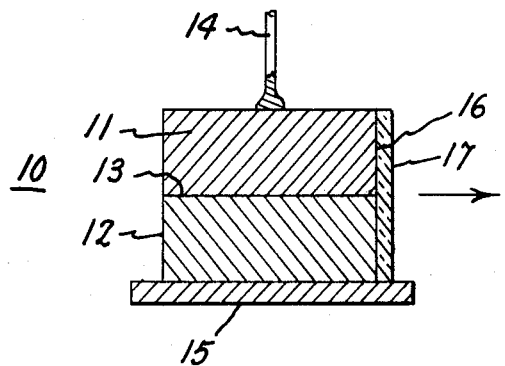
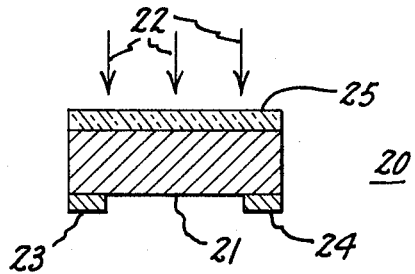
Inventor:
Herbert R. Philipp,
by Edward D. Murphy
His Attorney.

United States Patent Office 3,517,198
Patented June 23, 1970

3,517,198
LIGHT EMITTING AND ABSORBING DEVICES
Herbert R. Philipp, Schenectady, N.Y., assignor to General Electric Company, a corporation of New York
Filed Dec. 1, 1966, Ser. No. 598,319
Int. Cl. H01l 12/00
U.S. Cl. 250—211                                    9 Claims

ABSTRACT OF THE DISCLOSURE

An antireflecting coating of silicon nitride is used for minimizing reflections at the interface between a semiconductive device which either emits or absorbs electromagnetic radiation and the medium in which the device is used by selecting an index of refraction which is substantially equal to the square root of the product of the indices of the device and the medium. The index of refraction of silicon nitride coating is preselected by preselecting the temperature at which the coating is produced, either by glow discharge dissociation of gases, pyrolytic decomposition of gases, or otherwise. The thickness of the coating is selected so that the product of coating thickness and coating index of refraction is substantially equal to an odd number of quarter wavelengths of radiation to be passed.

---

The present invention relates to the field of light emitting or absorbing devices and more particularly relates to improvements in the transmission of light into and out of such devices.

Semiconductive light sources and light absorbers such as silicon carbide or gallium arsenide light emitting diodes and silicon photocells are used in many devices for the production and utilization of electromagnetic radiation. A limitation on the efficiency of such devices is the necessity of transmitting radiation into or out of these materials through interfaces with mediums having different indices of refraction. Reflection at such interfaces can reduce the amount of radiation transmitted by as much as 35% and thus reduce the efficiency of the device by at least this percentage.

Accordingly, it is an object of this invention to provide novel devices for the emission or absorption of light.

A further object is the provision of novel semiconductive light emitting or absorbing devices of increased efficiency.

A specific object of this invention is the provision of highly efficient light emitting or absorbing devices including a novel antireflecting coating.

Briefly, in accord with the present invention, I provide semiconductive devices which include a body of either gallium arsenide, gallium phosphide and mixtures or alloys thereof and silicon, wherein emission or absorption of electromagnetic radiation occurs and which include a surface through which the radiation is transmitted to or from another medium. In further accord with this invention, the device includes an antireflecting coating having a variable index of refraction which may be preselected to have the value required to minimize reflection at the interface between the device and the medium in which it is to be used. This coating comprises silicon nitride, the index of refraction of which is selected by means of the temperature at which it is produced to be substantially equal to the square root of the product of the indices of the device and the adjacent medium. The thickness of the coating is selected so that the product of coating thickness and coating index of refraction is substantially equal to an odd number of quarter wavelengths of the radiation to be transmitted.

The novel features believed characteristic of the invention are set forth in the appended claims. The invention itself, together with further objects and advantages thereof may best be understood by reference to the following description taken in connection with the appended drawings in which:

FIG. 1 is a perspective view, partially broken away, of a light emitting device in accord with this invention; and FIG. 2 is a perspective view, partially broken away, of a light absorbing device in accord with this invention.

In accord with this invention I have found that light absorbing and emitting devices of semiconductive materials such as gallium arsenide, gallium phosphide and mixtures or alloys thereof and silicon which incorporate an antireflecting layer of silicon nitride made in accord with this invention are much more efficient than those previously known. In particular, I have discovered that the index of refraction of silicon nitride may be varied in the devices to provide exactly the value required to provide an antireflecting coating for these materials.

Antireflective coatings comprise thin layers of a material having an index of refraction substantially equal to the square root of the product of the indices of refraction of the mediums which are juxtaposed at the interface. If the product of the thickness and the refractive index of the coating is equal to an odd number of quarter wavelengths of the radiation being transmitted, reflection is reduced nearly to zero. I have found that layers of silicon nitride of a thickness of less than 0.1 micron can be adjusted so that the index of refraction thereof corresponds to that required by this condition to provide an antireflecting coating which is nearly ideal for the materials named above. I have also found that such layers of silicon nitride, although extremely thin, embody the further advantage of forming an excellent protective coating for the device, thus reducing or even eliminating the need for additional protective material, wherein energy loss due to absorption and due to reflection at the additional interfaces can occur.

Specifically, the index of refraction of silicon is about 3.8 for the wavelengths which it absorbs. The index of gallium arsenide is about 3.6 in the vicinity of its emission wavelength; that of gallium phosphide is about 3.1 at the wavelength of its emission and the indices for mixtures or alloys of gallium arsenide and and gallium phosphide lie between 3.1 and 3.6 depending on the relative quantities present. As previously mentioned the index of an antireflective coating should closely approximate the value given by the equation $n_1 = \sqrt{n_2 n_0}$ where $n_1$ is the index of refraction of the antireflecting coating, $n_2$ is the index of refraction of the device material and $n_0$ is the index of refraction of the adjacent medium. Thus, for transmission into air or vacuum, $n_0=1$, the coating for these materials must have an index in the range of 1.76 to 1.90. I have found that silicon nitride can be deposited on these devices in coatings which are transparent and which have any preselected index in the range and thus can be matched precisely to the material in question.

Accordingly, by appropriate selection of the film thickness to meet the condition that the thickness times the index be equal to an odd number of quarter wavelengths, preferably 1, an antireflecting coating which reduces reflection to the minimum can be provided. Furthermore, since silicon nitride is resistive to chemical attack and prevents impurity diffusion it isolates the device chemically and since it is of high dielectric strength, it also provides electrical insulation, thus eliminating the need for additional coatings for these purposes.

In the device shown in FIG. 1, a light emitting diode embodying the above-described concept is illustrated comprising a crystalline body 10 of gallium arsenide including regions 11 and 12 of opposite conductivity type and a p–n junction 13 therebetween. Electrodes 14 and 15 are provided for the application of a current therethrough for conversion to electromagnetic radiation in the junction. The emitted radiation is produced in a plane parallel to the junction and is emitted through surface 16 of the body 10 for use in any desired manner. For example, the device as illustrated may comprise a laser and the radiation emitted may be used for communication.

In accord with this invention, the device also incorporates a layer 17 of silicon nitride overlying the emissive surface 16. This layer is provided having a preselected index of refraction equal to the square root of the index of the device. In this case, the value is approximately 1.9, the square root of the index of refraction of gallium arsenide at 7000 angstrom units. The reflection in devices constructed as shown in FIG. 1 has been measured to be less than 0.4% as compared to 35% for devices not including the antireflective coating in accord with this invention. The overall efficiency of the devices is increased by a corresponding amount. In addition, such coatings have been found to be substantially impervious to atmospheric impurities and other forms of chemical attack and electrically insulated except for the required electrode connections.

FIG. 2 illustrates, as an alternative, a photocell 20 in accord with this invention which includes a photoconductive body 21 of silicon. Light impinging as indicated by the arrows 22 strikes the body 20, producing a current flow therein which is utilized by means of electrodes 23 and 24. In accord with this invention, an antireflective coating 25 is provided on the surface of the body. The function of this coating is similar to that described in connection with FIG. 1; that is, it serves to protect the silicon body and to reduce loss of light due to reflection at the interface. In this case, the index of refraction of the silicon nitride is selected to be 1.95, the square root of the index of refraction of silicon in the range of 6000 to 8000 angstrom units, 3.8. The coating provides advantages similar to those previously described.

Silicon nitride coatings in accord with this invention may be produced by various methods; however, it is preferred to utilize the glow discharge dissociation of gases containing silicon and nitrogen. In this method, the energy required for dissociating the gases is supplied by an RF discharge through which the gases are passed and the substrate temperature, which is the temperature at which the formation of the coating occurs, can be independently controlled. Other methods such as pyrolitic decomposition of gases containing silicon and nitrogen preferably silane and ammonia, or sputtering of silicon in the presence of nitrogen may also be used.

In any case, the coating produced is a solidified amorphous layer of silicon and nitrogen; in other words, a glass. Since a glass is a solution, the proportion of the elements present may vary and it may include small percentages of other elements such as hydrogen and oxygen. It is believed that the determining factor which results in a given index of refraction is the density of the coating and this can be varied by varying the temperature at which the reaction is performed; however, it is not intended to limit the present invention to this explanation. The presence of other elements as impurities is possible and these will contribute to the density variation; however, the coating should be essentially silicon nitride. Numerically, the coating should be at least 85% by weight silicon nitride.

In broad terms, my invention is based on the discovery that the index of refraction of silicon nitride can be preselected by performing the deposition at a preselected temperature. As the temperature of deposition ranges from room temperature to 1200° C., the index of refraction of the resultant silicon nitride ranges from 1.5 to 2.3.

Thus, if a device is to be fabricated using a given material such as $GaAs_{0.4}P_{0.6}$, and it is known that the device is to be used for light emission into air, the reaction temperature is determined by measuring the index of the material, taking its square root and selecting the corresponding temperature. The precision with which this determination must be made depends on the degree of improvement desired; for example, in a laser wherein efficiency of output is of the utmost importance, the selection of the index of silicon nitride is done with great precision so as to reduce reflection to the absolute minimum.

The deposition is then carried on for a time sufficient to deposit the required coating thickness. Since the emission or absorption wavelength is generally in the infrared or visible spectrum, in the range of 4000 to 8000 angstrom units, and since it is preferred that the product of coating thickness and index be equal to one quarter wavelength to minimize adsorption, the coating thickness is generally on the order of 0.1 micron or less. The reaction, to produce a coating of this thickness, is generally carried on for a time in the order of 1 to 20 minutes.

Thus, the present invention is directed to a novel device which includes a body of the named materials through a surface of which light is to be transmitted. It is noted that, throughout this specification and the following claims the word light is intended to mean electromagnetic radiation including both visible light and invisible light as infrared. The device of the present invention also includes an antireflecting coating of silicon nitride, the index of refraction of which can be varied to a preselected value so as to match precisely with the index of the material used in the device. Although the degree of precision depends on the circumstances in which any given device is to be used, it is preferred that the index of refraction of the antireflective coating provided be within 5% of the optimum value for the material and wavelength in question in order to avoid a substantial degree of reflection.

As previously stated, the index of refraction of the coatings may be made to vary over a range of 1.5 to 2.3. The precise correspondence of index-to-temperature varies with the apparatus and method used since differences in geometry or in the pressures of the gases supplied at the surface, etc. cause some variation. However, in general, it has been found that, in the glow discharge method, the following temperature ranges produce indices approximately within the following limits: temperatures of 0° C. to 200° C. produce indices of 1.5 to 1.8; temperatures of 200° C. to 400° C. produce indices of 1.7 to 1.9; temperatures of 400° C. to 600° C. produce indices of 1.8 to 2.0; and temperatures of 600° C. to 1000° C. produce indices of 1.9 to 2.1.

The coatings produced by pyrolytic decomposition are essentially the same in the range of 800° C. to 1000° C. while those produced by sputtering are generally more dense than coatings produced at the same temperatures by the glow discharge method; however, a similar variation of index with temperature of formation has been found. These values of index may also be deliberately changed by changing the ratio of gas pressures or by deliberately introducing impurities as previously mentioned.

The following examples are set forth to exemplify the practice of this invention. These examples include specific values of the parameters involved so that the invention may be practiced by those skilled in the art. It is noted however, that these examples are provided for purposes of illustration only and are not to be construed in a limiting sense.

EXAMPLE 1

A gallium arsenide light emitting diode is disposed in an evacuated chamber and heated to a temperature of 500° An RF discharge is established, by means of electrodes and an applied RF voltage, in silane and ammonia which are introduced at respective partial pressures of 50 microns and 300 mircons. After about 2 minutes, the diode is removed from the apparatus and a coating of silicon nitride 1100 angstrom units thick is found on the surface of the diode. The index of refraction of this coating is 1.90 and the reflection loss of light emitted through the coating is determined to be less than 0.2%.

EXAMPLE 2

The process described in Example 1 is repeated except that the diode is composed of gallium arsenophosphide having an index of refraction of 3.3. The temperature of the diode is 300° C. The results are as stated in Example 1 except that the index of refraction of the coating is 1.82.

EXAMPLE 3

The process of Example 1 is carried out on a silicon carbide diode at a temperature of 25° C. The results are as stated in Example 1 except that the index of refraction of the coating is 1.64.

EXAMPLE 4

A silicon photocell is placed in an evacuated chamber and heated to a temperature of 600° C. Silane and ammonia are introduced and the system is maintained for about 4 minutes. At the end of this time, a coating of silicon nitride 900° A. thick is found on the surface of the photocell. The index of refraction of the coating is 1.95 and the reflection of light introduced through this coating is determined to be less than 0.2%.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. In a device of the character described including a region through which radiation is transmitted, said region comprising a material having an index of refraction approximately in the range of 2.2 to 5.3; and an interface with an adjacent medium through which said radiation is transmitted; the improvement comprising a protective, antireflecting coating of silicon nitride, said coating being fabricated to have a preselected index of refraction dependent upon the temperature of formation of said coating and wherein said preselected index of refraction is substantially equal to the square root of the product of the indices of refraction of said adjacent medium and of the material of said region.

2. The device claimed in claim 1 wherein said index of refraction of said coating is within 5% of the square root of the product of said indices of said medium and of said material.

3. The device claimed in claim 1 wherein the thickness of said coating is such that the product of said coating and said coating index is substantially equal to an odd integer multiple of a quarter wavelength of the radiation to be transmitted.

4. The device claimed in claim 3 wherein said odd integer is one.

5. The device claimed in claim 1 wherein said device is substantially enclosed by said silicon nitride coating.

6. The device claimed in claim 1 wherein said device comprises a photocell, said material comprises silicon and said coating is fabricated to have an index of refraction of 1.95.

7. The device claimed in claim 1 wherein said device comprises a light emitting diode, said material comprises gallium arsenide and said coating is fabricated to have a preselected index of refraction of 1.90.

8. In a method of preparing a device having a radiation-transmissive region and a surface through which said radiation is transmitted into an adjacent medium; said region having an index of refraction in the range of 2.2 to 5.3; the improvement comprising forming on said surface a coating comprising silicon nitride, said coating being formed at a preselected temperature so as to have an index of refraction dependent thereon and substantially equal to the square root of the product of the indices of refraction of said region and said medium.

9. The method claimed in claim 8 wherein said coating is formed by dissociating gases containing silicon and nitrogen in an RF discharge and deposting said elements on said device.

References Cited

UNITED STATES PATENTS

| 2,784,639 | 3/1957 | Keenan et al. | 350—164 |
| 3,076,861 | 2/1963 | Samulon et al. | 250—212 X |
| 3,114,652 | 12/1963 | Shetky | 117—93.1 |
| 3,122,450 | 2/1964 | Barnes et al. | 117—230 |
| 3,160,522 | 12/1964 | Heywang et al. | 117—93.1 X |
| 3,246,214 | 4/1966 | Hugle | 117—93.1 X |
| 3,247,014 | 4/1966 | Goldberger et al. | 117—93.1 X |
| 3,247,392 | 4/1966 | Thelen | 250—226 |
| 3,354,316 | 11/1967 | Deverall | 250—211 |

FOREIGN PATENTS 1,190,308 3/1959 France.

OTHER REFERENCES

Lamorte et al.: Electronics; vol. 37; No. 20; July 13, 1964; pp. 61–65.

WALTER STOLWEIN, Primary Examiner

U.S. Cl. X.R.

117—93.1; 250—217; 350—164